Feb. 24, 1942.  R. B. McKINNIS  2,274,243
CHAMBER CHARGING MECHANISM
Original Filed Aug. 11, 1938  5 Sheets-Sheet 3
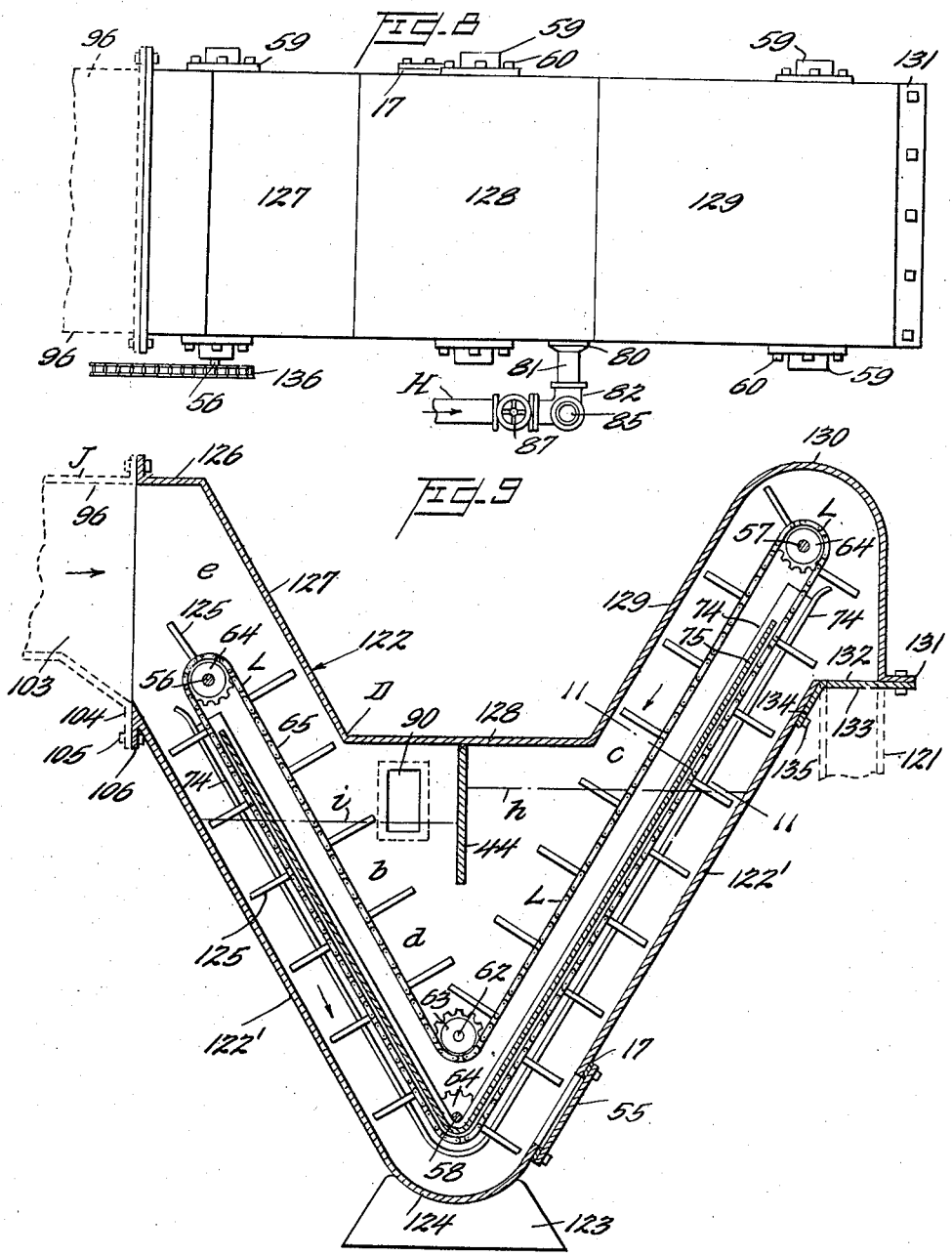

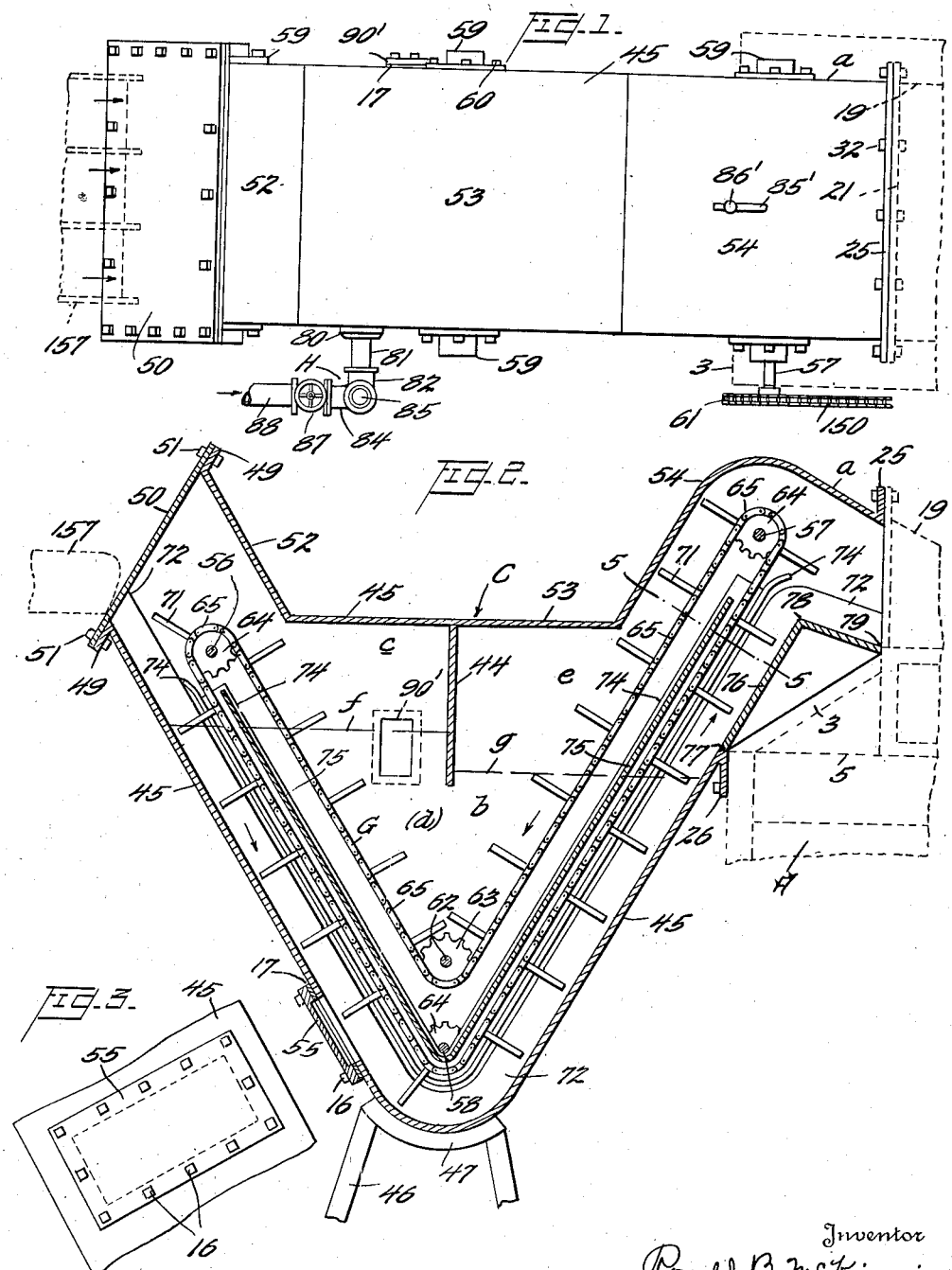

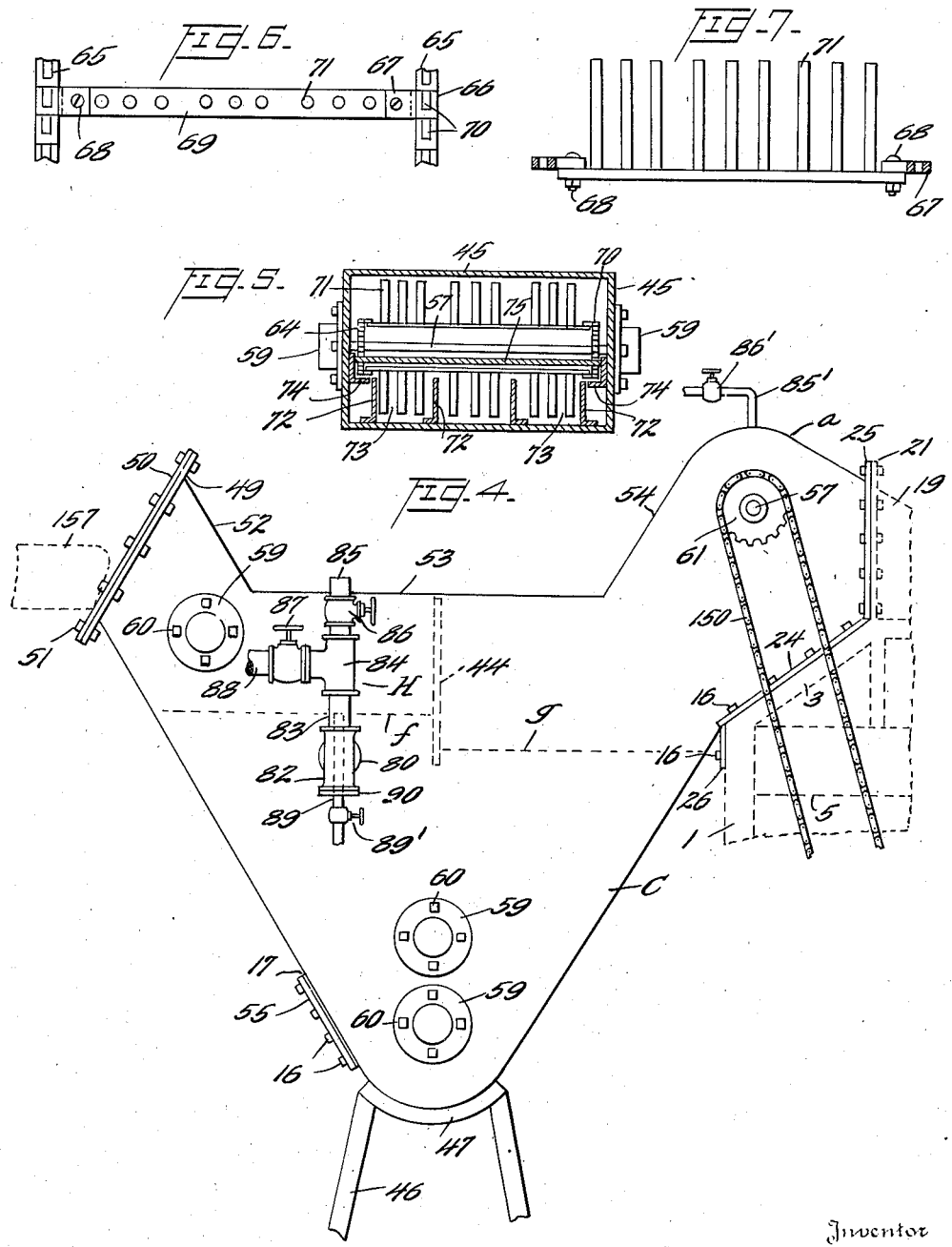

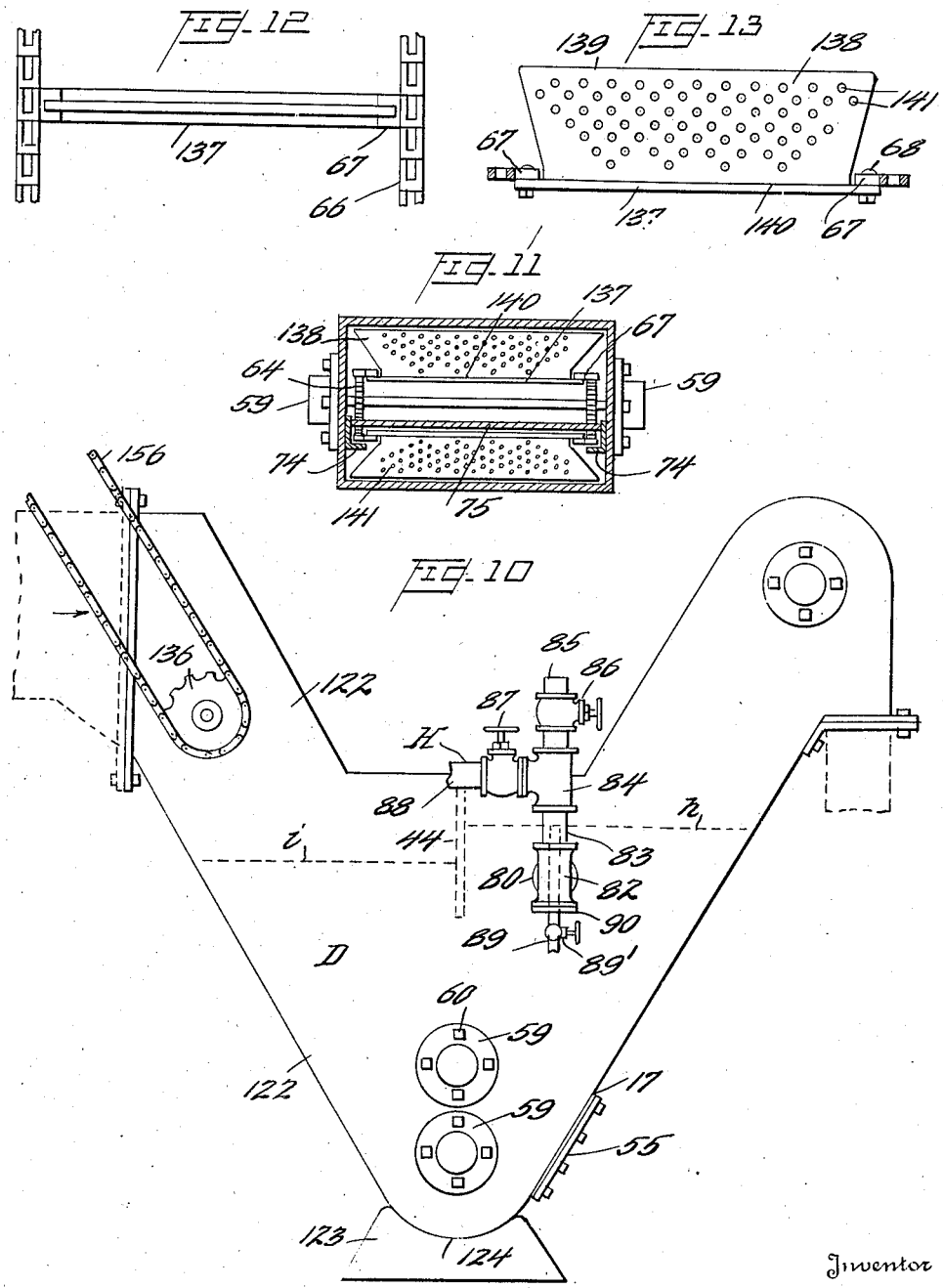

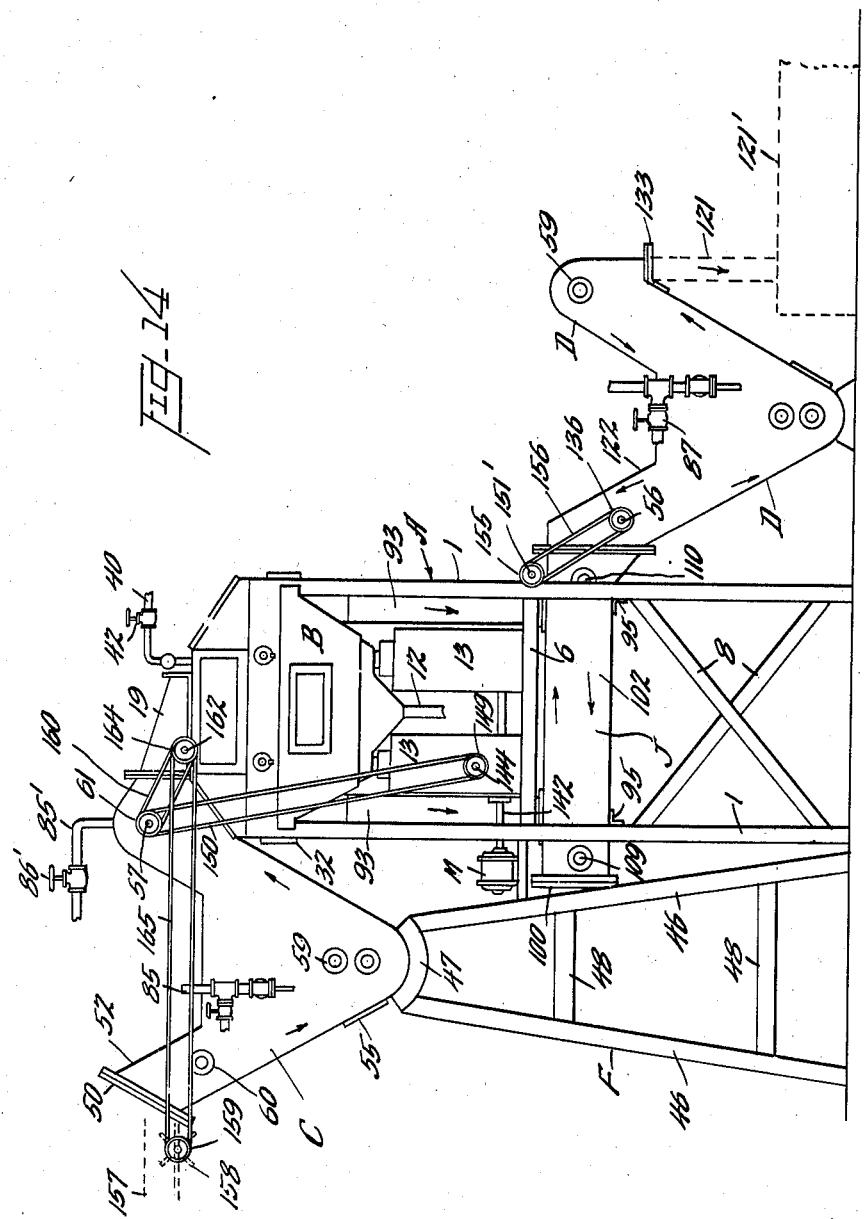

Patented Feb. 24, 1942

2,274,243

UNITED STATES PATENT OFFICE 2,274,243

CHAMBER CHARGING MECHANISM

Ronald B. McKinnis, Winter Haven, Fla., assignor to Sunshine Foods Inc., Winter Haven, Fla., a corporation of Florida Original application August 11, 1938, Serial No. 224,388. Divided and this application May 15, 1939, Serial No. 273,790

5 Claims. (Cl. 214—17)

Generically, this invention relates to the extraction of fruit and vegetable juices and more particularly to a liquid seal delivery means through which the fruit or vegetables are conveyed to the extracting machine and the liquid seal discharge means through which the rinds, pulp, seeds, etc., are delivered from the apparatus. This application is a division of my co-pending application, Serial No. 224,388, filed August 11, 1938, which is now Patent No. 2,226,513, issued December 24, 1940.

It is known in the art that when fruit and vegetable juices are extracted in the presence of oxygen, the oxygen has a deleterious action on the juice and one of the principal objects of this invention is to provide means for conveying the whole fruit or vegetable to the extracting machine in such a manner that they will not be subject to the action of oxygen, and removing the rind, pulp, etc., from the extracting machine in a similar manner.

Another object of this invention is to provide a conveying apparatus for transferring fruit and vegetables or other buoyant bodies between atmospheres of different gases wherein means are provided to maintain the buoyant bodies out of contact with oxygen during their movement from one atmosphere to the other.

And another object of this invention is to provide a conveying mechanism for transferring fruit and vegetables and other buoyant bodies between atmospheres of different gases wherein a liquid seal is provided for the mechanism and additional means is provided to maintain the buoyant bodies immersed in the liquid during their movement from one atmosphere to the other.

And a further object is to provide a conveying apparatus of the character herein described comprising a casing which connects the atmospheres having receiving and discharging apertures, a liquid within the casing sealing one atmosphere from the other, trough means in the casing extending from the receiving aperture to the discharging aperture through which the bodies are adapted to move, means to move the bodies through the trough means, and retaining means cooperating with the trough means and moving means to keep the buoyant bodies immersed in the liquid during their movement from one atmosphere to the other.

And still a further object of this invention is to provide an extracting machine with a liquid seal delivery means through which the fruit or vegetable is conveyed to the extracting machine and a liquid seal discharge means through which the rinds, seeds, pulp, etc., are adapted to be delivered from the apparatus.

With these and other objects in view, which will become apparent as the description proceeds, the invention resides in the construction, combination and arrangement of parts, hereinafter more fully described and claimed, and illustrated in the accompanying drawings, in which like characters of reference indicate like parts throughout the several figures, of which:

Fig. 1 is a top plan view of the fluid seal delivery conveyor and fluid supply, venting and overflow unit.

Fig. 2 is a longitudinal section through Fig. 1.

Fig. 3 is an elevation of the clean out door and portion of the conveyor casing.

Fig. 4 is a side elevation of the delivery conveyor and the fluid supply, venting and overflow unit.

Fig. 5 is a cross section taken on the line 5—5 of Fig. 2.

Fig. 6 is a top plan view of one of the separator members, conveyor fingers, and portions of the endless conveyor chains.

Fig. 7 is a side elevation of Fig. 6 with the separator attaching links of the endless chain partly in section.

Fig. 8 is a top plan view of the fluid seal discharge conveyor and fluid supply, venting and overflow unit.

Fig. 9 is a longitudinal section through Fig. 8.

Fig. 10 is a side elevation of the discharge conveyor and the fluid supply, venting and overflow unit.

Fig. 11 is a cross section taken on the line 11—11 of Fig. 9.

Fig. 12 is a top plan view of one of the separator members, conveyor blades and portions of the endless conveyor chains.

Fig. 13 is a side elevation of Fig. 12 with the separator attaching links of the endless chains partly in section.

Figure 14 is a diagrammatic view in front elevation of the entire apparatus showing the location of the liquid seal conveyors.

This invention, while primarily applicable to the extraction of juice from the citrus fruits such as oranges, grapefruit, lemons, limes, tangerines, tangelos, etc., may be employed with equal facility for extracting the juice from peaches, apples, celery, carrots, grapes, tomatoes, and the like.

Normally the juices from these fruits and vegetables deteriorate and lose their food value by virtue of the action of certain micro-organisms; by oxidation of their essential oils, esters, aldehydes, etc., and by the inclusion of alkaloids, glucosides and oil from the pulp or outer peel; and to overcome the preceding bacteriological and chemical effects, by providing an air-tight chamber housing the extractor cup drum and ejector assemblies having a fluid air seal delivery conveyor structure at one end of the apparatus and a discharge fluid seal conveyor structure at the other, and a combined fluid supply, air venting and overflow unit connected with each conveyor structure, whereby the apparatus is initially filled with a sterilizing fluid forcing out all air, then is replaced filling such space intermediate the end fluid seals with an inert gas, and additional means for forcing out all air from the extractor cup drum assemblies through the openings surrounding the ejector mechanisms and preventing the entrance of water therethrough during the filling and emptying operations, and upon completion of such operations the device intermediate the end fluid seals is filled with an oxygen free inert gas and whereby the outer surface of the fruit after it enters the apparatus is first sterilized and then delivered to the extracting mechanism within the gas filled chamber without chance of contamination and in which oxygen free atmosphere the juice is extracted and delivered to oxygen free containers for subsequent consumption without impairment of its natural flavor and original vitamin content, I evolved the method and apparatus forming the subject matter of this invention.

Before proceeding further with the discussion of this invention, it is deemed advisable to state at this point that this invention, although primarily designed for the extraction of juice from citrus fruits, may be advantageously employed for the extraction of juices from other fruits and vegetables, hence, for the sake of convenience and to avoid repetition, it is to be understood that wherever in the specification and claims reference is made to "fruit" this expression is to be construed as embracing fruit, vegetables, and the like.

Generally, my invention comprises a juice extractor unit B that is provided with a fluid seal conveyor device C that is adapted to deliver the whole fruit or vegetable to the extractor B. A horizontal hull conveyor or the like J receives the rind, pulp, seeds, etc., from the extractor B after the extraction of the juice, and the conveyor J is in communication with a fluid seal conveyor D which is adapted to deliver the rind, seeds, etc., from the extracting machine B.

There are a number of different mechanisms already in use for actually extracting the juice from the fruit which may be employed in unit, such, for instance, as the type covered by Patents Nos. 1,888,528 and 1,888,529. However, these are more or less open to the atmosphere, and it is applicant's purpose in carrying out his method to effect extraction of the juice from the fruit in an air tight gas filled chamber and which he accomplishes by either encasing a device such as shown in said patents to Faulds, or other like devices, by forming an air tight chamber surrounding the extracting mechanism or by placing said mechanism in an air tight chamber included in his improved apparatus having proper delivery and discharge fluid air seal mechanisms communicating with said chamber, as will hereinafter more fully appear.

*Fluid seal delivery conveyor*

The fluid seal delivery conveyor C (Figs. 1 and 2), now to be described, is adapted to deliver the fruit from a source of supply to the hermetically sealed juice extracting gas filled chamber through what may be a sterilizing fluid *b* forming an air seal for said chamber, the conveyor being so constructed as to form what may be considered an atmospheric pressure section *c*, a fluid containing section *d*, and a gas section *e*, so that the pressure in the gas section may be adjusted relative to the atmospheric pressure prevailing in the atmospheric section to provide on opposite sides of a suitably arranged partition or dividing plate 44 the water levels *f* and *g*, respectively, indicated in dotted lines (Figs. 2 and 4), and whereby the exterior of the fruit is sterilized as it is conveyed through said fluid and delivered therefrom to the oxygen free juice extracting chamber E without exposure to contamination, as will directly more fully appear.

The outer casing 45 of conveyor structure C is substantially V-shaped and is supported, in the present instance, on the stool-like frame structure F comprising spaced pairs of legs 46 bent or otherwise formed at their upper ends to provide the curved seats 47 conforming to the shape of the lower end of said casing, said legs being suitably connected by cross bars 48. Casing 45 is formed at its fruit receiving end with a substantially lateral flange 49 on which is adapted to seat the removable plate 50 detachably secured by fastening elements 51 for a purpose directly appearing. The top of casing 45 is constructed with a portion 52 extending downwardly in parallelism with the corresponding bottom portion, a central horizontal portion 53, and an upwardly and downwardly inclined portion 54 forming the discharge end *a* terminating in the vertical flange 25. Said end *a* when secured as hereinbefore described forms with hood 19 a sealed discharge connection between conveyor C and the extractor unit, as will be apparent. Casing 45 is provided adjacent its lower end with a cleanout door or plate 55 secured by fastening elements 16, and the depending dividing plate or partition 44 is suitably secured to the under surface of top section 53 of said casing, as will be well understood.

Mounted in the casing 45 (Fig. 2) and adjacent the inlet end, the discharge end, and the lower end, are a trio of shafts 56, 57, and 58 journaled in cap bearings 59 mounted exteriorly of said casing and secured by fastening elements 60, excepting that shaft 57 at one end extends through its bearing 59 and has suitably keyed or otherwise mounted on its free end drive pulley or sprocket 61. Mounted on opposite sides of said casing vertically spaced above shaft 58 and mounted in similar bearings 59 are stub shafts 62 on the free ends of which are suitably mounted sprocket wheels 63. Mounted interiorly of the casing and adjacent opposite sides thereof on the shafts 56, 57, and 58 are the sprocket wheels 64 over which latter wheels and under sprocket wheels 63 are adapted to travel the endless sprocket chains 65, said chains having inserted in predetermined and equi-spaced relation anchor links 66 (Figs. 6 and 7) having extensions 67 to which are secured by bolts 68 the ends of the respective separator members 69. Sprocket chains 65 are formed with suitable sprocket openings 70. Suitably mounted on said separator elements and projecting normally from the outer surface thereof are a plurality of fruit engaging fingers 71. Suitably secured to the inner bottom surface of casing 45 by welding, riveting, or otherwise, are, in the present instance, four vertical partitions 72 (Fig. 5) positioned to form three fruit channels 73 in each of which are adapted to extend from the bottom stretch of the endless conveyor G a trio of fingers 71 for conveying the fruit in proper feeding order from the inlet to the outlet of the conveyor through the sterilizing fluid, the order of the feeding being timed with the operation of the extracting mechanism, as will hereinafter appear.

While the fingers 71 are shown as mounted in alignment on separator element 69, it will be understood that the middle finger of each group adapted to project in the channel 73 may be rearwardly offset with respect to the outer fingers; also, the number may be varied so that the groups traveling in a respective channel may be alternately staggered, if desired.

A pair of L-shaped track members 74 (Fig. 2) curved downwardly at their ends, adapted to prevent sagging of the lower stretch of the endless chains 65, are mounted on the respective inner sides of casing 45 equi-spaced throughout their length from the bottom of said casing and secured similar to partition 73 or in any suitable manner. For the purpose of confining the fruit within the channels 73 in the course of its travel through fluid $b$ there is mounted between the stretches of the endless conveyor G a V-shaped confining plate 75 welded or otherwise secured to the track members 74.

It will be noted with respect to the end portion $a$ (Fig. 2) of conveyor C that the casing 45 extends downwardly terminating in flanges 25 secured to frame sections 3, and mounted within said casing is an auxiliary bottom section 76 constituting a continuation of the bottom of casing 45, from a point 77 to 78 and then downwardly at an incline to 79 to form with partitions 72 continuations of channels 73 so that from point 78 the fruit will be delivered by gravity through a hood 19 to the juice extracting mechanism.

*Combined water supply, venting and overflow unit*

In order to initially fill the machine completely with hot water or other sterilizing fluid to sterilize the machine, displace the air therein, and also to control the predetermined quantity of fluid in conveyor C and provide an air lock for the extractor chamber, there is mounted on the side of and communicating with the interior of casing 45 of conveyor C, a combined water supply, venting and overflow unit H, now to be described (Figs. 1 and 4).

Suitably secured to the side of casing 45 adjacent the lower end of dividing plate 44 is a mounting 80 through which extends and is adapted to be supported thereby, one end of nipple 81, the remaining parts of unit H comprising lower T-section 84, vent pipe 85, vent pipe control valve 86, water or fluid supply control valve 87, water or fluid supply line 88, and overflow and drain pipe 89, suitably interconnected as clearly shown in Figs. 1 and 4 of the drawings. It will be further noted that the overflow pipe 89 extends upwardly through T-section 82, plug element 90 by which it is supported, and within nipple 83, with its upper end normally coincident with water level $f$ which level said end determines. The overflow pipe 89 has mounted therein control valve 89' for use when initially filling the machine with water. Also suitably mounted at the apex of portion 54 of conveyor C is a vent pipe 85' having control valve 86' adapted to be opened during the initial filling of the machine with water and closed when all of the air has been exhausted from the apparatus and said conveyor above the fluid seal.

The overflow pipe 89 being smaller than the interior dimensions of T-section 82 and nipple 83, a water or fluid space around said pipe is provided, on which column of water air is permitted to act through the normally open vent pipe 85, and whereby atmospheric pressure in section $c$ is maintained.

A window 90' is provided in the side of casing 45 as shown in Fig. 2, and its size and position may be varied as desired so that not only the travel of the fruit may be observed but also the relative water levels on opposite sides of dividing plate 44.

*Fluid seal hull discharge conveyor*

This conveyor D (Figs. 9 and 10) is substantially similar to the delivery conveyor C except that its conveyor operation is reversed and it is adapted to convey portions of the fruit from which juice has been extracted or hulls from a hull conveyor J to a vertical chute 121 or other suitable receptacle for receiving the hulls, through fluid $b$ forming an air seal for the discharge end of said hull conveyor J, the conveyor being so constructed as to form an atmospheric pressure section $c$, a fluid containing section $d$, and a gas section $e$ communicating with said hull conveyor, so that the pressure in the gas section may be adjusted relative to the atmospheric pressure prevailing in the atmospheric section to provide on opposite sides of a suitably arranged partition or dividing plate 44 the water levels $h$ and $i$ maintained in a manner similar to the levels $f$ and $g$, as heretofore described in connection with conveyor C.

The outer casing 122 is substantially V-shaped and supported in the present instance on a saddle support or block 123 hollowed out to conform to the configuration of the lower end of said casing as at 124. Said casing 122 is formed with flange 106 for connection with flange 104 of hull conveyor J, the bottom of said casing 122 forming in effect a continuation of portion 103 so as to deliver the hulls to the conveyor blades 125.

The top of casing 122 (Figs. 8 and 9) is constructed with a portion 126 extending in alignment with top 96 of hull conveyor J, a portion 127 extending downwardly in parallelism with the corresponding bottom portion 122', a central horizontal portion 128, a portion 129 extending upwardly in parallelism with its corresponding bottom portion to a point 130 and in substantially the same horizontal plane as 126, thence downward terminating in the lateral flange 131. The bottom 122' terminates at a point opposite to flange 131 thereby forming a discharge opening 132 adapted to be closed during the initial filling of the machine with water or other fluid by the detachable plate 133 having a depending portion 134 secured to bottom portion 122' and flange 131 by fastening elements 135, said plate adapted to be removed after the machines have been freed from air or sterilized as heretofore described. Similarly positioned and secured to the under surface of section 128 is a dividing plate similar to that described in connection with conveyor C.

The conveyor mechanism within the casing 122 is substantially similar in construction and operation to that described in connection with conveyor C and comprises a trio of shafts 56, 57, and 58 journaled in cap bearings 59 secured by fastening elements 60, except in this instance, shaft 56 at one end extends through bearing 59 and has suitably mounted thereon drive pulley or sprocket 136 for driving said conveyor mechanism, instead of shaft 57 as heretofore described. Mounted on opposite sides of said casing vertically spaced above shaft 58 are sprocket wheels 63 as heretofore described. Mounted on shafts 56, 57 and 58 are sprocket wheels 64 over which latter wheels and under sprocket wheels 63 travel the endless sprocket chains 65 having spaced anchor links 66, to the extensions 67 of which are secured by bolts 68 the ends of the respective separator members 137 (Figs. 11 and 12). Said separator members 137 are similar to separators 69 described in connection with conveyor C except they have longitudinally secured thereto and extending at right angles therefrom the conveyor blades or plates 138, in the present instance, wider at their free edges 139 than the edge 140 suitably secured to said separator members 137. Said blades 138 (Fig. 13) are perforated substantially throughout as at 141 so as not to carry the water or fluid b from the conveyor, as will be well understood.

Mounted in casing 122 similar to conveyor C and similarly functioning are a pair of L-shaped track members 74 and a confining plate 75 mounted between the stretches of the endless conveyor L, as will be apparent.

Casing 122 as in the case of conveyor C, is provided with a window 90' and with cleanout door 55.

*Combined water supply, venting and overflow unit*

This unit, mounted on the fluid seal hull discharge conveyor D, is exactly alike in construction and function to the similar unit H described in connection with conveyor C, and comprises mounting 80, nipple 81, T-section 82, nipple 83, T-section 84, vent pipe 85, vent pipe control valve 86, water or fluid control valve 87, fluid supply line 88, overflow and drain pipe 89, overflow control valve 89', and drain pipe supporting means 90, and it is therefore not deemed necessary to describe this unit H in detail.

The mode whereby the conveyors C and D are driven is such that they operate in synchronism with the extracting unit B. In view of the fact that this drive is shown and described in my patent, No. 2,226,513, issued December 24, 1940, I will limit my description of the driving means.

Referring to Figure 14, it will be noted that the fruit or vegetables are fed into the conveyor C by means of a paddle wheel 158 in communication with a conveyor 157. The paddle wheel 158 is of course adapted to operate in the three channels corresponding to the channel 73 in the casing 55 of the conveyor C. The paddle wheel 158 is driven from the shaft 57 through a double pulley 61, belt 160, pulley 161, shaft 162, sprocket 164, belt 165, and pulley 159. The drive is such that the feeding operation is timed in accordance with that of the conveyor G and the mechanism in the extracting chamber E.

After the seal conveyor C and plates 50 and 133 are in their closed position the overflow valves 89' are closed and the vent valves 86—86' are opened. The hot water or other fluid supply valves 87 are then opened to effect a sterilization of the conveyor and at the same time fill the conveyor with fluid. The vent valve 86 of the discharge conveyor D is closed when water flows from the vent pipe 85 and when the entire apparatus from the conveyor D to the delivery conveyor C has been completely filled with water so that the water flows from the vent pipe 85 of the delivery conveyor C, the supply valves 87 are closed and the overflow valves 89' are opened. In addition, the vent valve 86 is closed and the valve 86' of the conveyor C is also closed. Inert gas under pressure is admitted to the apparatus so as to fill the extracting chamber as the water is displaced. The withdrawal of the water and the introduction of the inert gas can be controlled as indicated by the pressure gauge by the opening of the vent valves to effect and maintain the atmospheric and gas pressure differential, as indicated by the water levels shown in dotted lines f and g and the delivery conveyor C and at h and i in the delivery conveyor D. When the water in the apparatus has been completely displaced by the inert gas from the water level g at one side of the conveyor C (Figures 2 and 4) to i in the delivery conveyor D (Figures 9 and 10), the flow of inert gas may be arrested and the cover plates 50 and 133 removed, whereupon the apparatus is in condition for the operation.

By starting the motor M, the paddle wheel 158 delivers the fruit to the fingers 71 of each separator 65. The fruit is conveyed through the sterilizing fluid b for delivery into the extracting machine B. The juices are of course extracted from the fruit in the machine B and the hulls or waste material are conveyed to the conveyor J for delivery to the discharge conveyor D where they move through the liquid seal to the discharge outlet 121 and are collected in a receptacle or the like 121'.

It will be apparent from the above description that I have evolved a method and apparatus for extracting and delivering to suitable containers fruit and vegetable juices under non-oxidizing conditions so that there will be no impairment of their natural flavor, aroma, and vitamin content, said apparatus being so constructed that the pre-treatment of the whole fruit and the extraction and collection of the juice is effected entirely within the apparatus, thereby eliminating any chance of contamination, said apparatus being compact in form, simple in construction, manufacturable and operable at a reasonable cost, and efficient for the purposes intended.

Although in practice it has been found that the form of the invention illustrated in the accompanying drawings and referred to in the above description as the preferred embodiment is the most efficient and practical, yet realizing the conditions concurrent with the adoption of the invention will necessarily vary, it is well to emphasize that various minor changes in details of construction, proportion and arrangement of parts, may be resorted to within the scope of the appended claims without departing from or sacrificing any of the principles of this invention.

Having thus described the invention, what is desired protected by letters patent is as set forth in the following claims:

1. A conveying mechanism for transferring buoyant bodies between atmospheres of different gases comprising a casing connecting the atmospheres having receiving and discharging openings, a liquid within the casing sealing one atmosphere from the other, trough means on the lower wall of the casing extending from the receiving opening to the discharging opening through which the buoyant bodies are adapted to move, means to move the buoyant bodies through the trough means, and retaining means cooperating with the trough means and moving means to maintain the buoyant bodies immersed in the liquid during their movement from one atmosphere to the other.

2. A conveying mechanism for transferring buoyant bodies between atmospheres of different gases comprising a casing connecting the atmospheres having receiving and discharging openings, a liquid within the casing sealing one atmosphere from the other, a channel on the lower wall of the casing extending from the receiving opening to the discharging opening through which the buoyant bodies are adapted to move, means projecting into the channel to move the buoyant bodies therethrough, and retaining means disposed above the said moving means to maintain the buoyant bodies immersed in the liquid.

3. A conveying mechanism transferring buoyant bodies between atmospheres of different gases comprising a casing connecting the atmospheres having receiving and discharging openings, a liquid within the casing sealing one atmosphere from the other, a channel on the lower wall of the casing extending from the receiving opening to the discharging opening, an endless conveyor within the casing adapted to travel a path which passes through the liquid from the receiving opening to the discharging opening, fingers carried by the endless conveyor and projecting into the channel for moving the buoyant bodies through the channel, and a retaining plate located above the channel for maintaining the buoyant bodies immersed in the liquid.

4. A conveying mechanism for transferring buoyant bodies between atmospheres of different gases comprising a casing connecting the atmospheres having receiving and discharging openings, a liquid within the casing sealing one atmosphere from the other, a plurality of channels on the lower wall of the casing extending from the receiving opening to the discharging opening, an endless conveyor in the casing adapted to travel a path which passes through the liquid seal and from the receiving opening to the discharging opening, fingers carried by the endless conveyor adapted to project into said channels for moving the buoyant bodies therethrough, and a retaining plate located above said channels for maintaining the buoyant bodies immersed in the liquid.

5. A conveying mechanism for transferring buoyant bodies between atmospheres of different gases comprising a V shaped casing connecting the atmospheres, said casing having receiving and discharging openings, a liquid within the casing sealing one atmosphere from the other, a plurality of channels on the lower wall of the casing, extending from the receiving opening to the discharging opening, an endless conveyor within the casing adapted to travel a path which passes through the liquid and from the receiving opening to the discharging opening, a plurality of fingers carried by said conveyor adapted to project into the channels for moving the buoyant bodies therethrough, and a V shaped retaining plate located above said channel for maintaining the buoyant bodies immersed in the liquid during their travel through the channels.

RONALD B. McKINNIS.